United States Patent [19]

Sisk

[11] Patent Number: 4,686,378

[45] Date of Patent: Aug. 11, 1987

[54] APPARATUS FOR GENERATING HEAT AND ELECTRICITY

[75] Inventor: Robert A. Sisk, Canton, Conn.

[73] Assignee: ETA Thermal Systems Corporation, North Canton, Conn.

[21] Appl. No.: 754,638

[22] Filed: Jul. 15, 1985

[51] Int. Cl.⁴ .......................................... F01K 17/02
[52] U.S. Cl. .................................... 290/2; 237/12.1; 165/58; 74/645
[58] Field of Search ................. 290/2; 237/8 R, 12.1, 237/13; 165/13, 14, 48.1, 58; 74/645

[56] References Cited

U.S. PATENT DOCUMENTS

| | | | |
|---|---|---|---|
| 1,552,661 | 9/1925 | Apple | 290/2 X |
| 1,761,849 | 6/1930 | Smith | 290/2 |
| 2,051,240 | 8/1936 | Berryman | 237/13 X |
| 2,130,606 | 9/1938 | Wanamaker | 290/2 |
| 2,637,305 | 5/1953 | Buffum | 237/12.1 X |
| 2,953,691 | 9/1960 | Rapp | 290/2 |
| 3,216,199 | 11/1965 | Shaw et al. | 290/2 |
| 3,944,837 | 3/1976 | Meyers et al. | 290/2 X |
| 4,065,055 | 12/1977 | De Cosimo | 290/2 X |
| 4,164,660 | 8/1979 | Palazzetti | 237/12.3 B X |
| 4,262,209 | 4/1981 | Berner | 290/2 X |
| 4,264,826 | 4/1981 | Ullmann | 290/2 |
| 4,275,311 | 6/1981 | Agazzone et al. | 290/2 |
| 4,343,999 | 8/1982 | Wolf | 290/2 |
| 4,406,402 | 9/1983 | Henriques | 237/8 R X |

Primary Examiner—Patrick R. Salce
Assistant Examiner—Emanuel Todd Voeltz
Attorney, Agent, or Firm—George W. MacDonald, Jr.

[57] ABSTRACT

An apparatus is disclosed for generating thermal and electrical energy outputs in response to thermal and electrical load requirements imposed thereon. The apparatus includes a variable speed power source and a mechanism for transferring thermal energy from the power source a coolant fluid. A generator is also provided and is driven by the power source to produce electrical energy for the electrical load. The output frequency of the generator is independent of the speed of the power source. A mechanism is also provided for extracting thermal energy from the coolant fluid and directing the thermal energy to the thermal load. Finally, a device is included for monitoring the loads and controlling the thermal and electrical outputs in response to the loads by independently varying the speed of the power source and the output frequency of the generator to provided desired thermal and electrical energy outputs.

35 Claims, 7 Drawing Figures

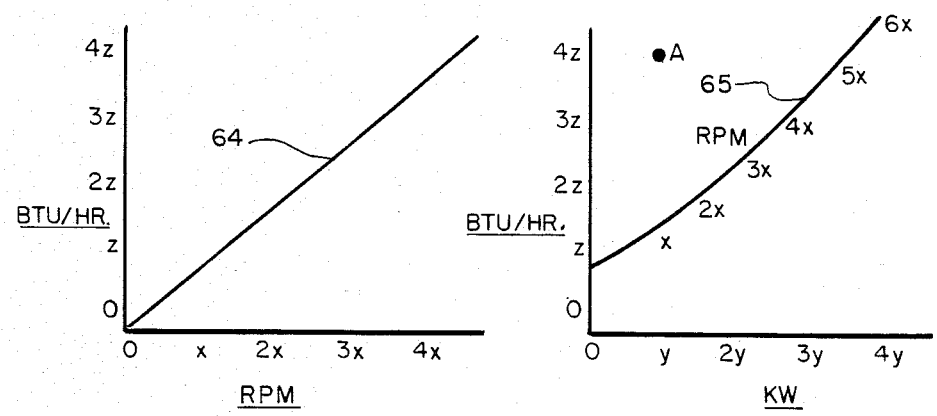
Fig-4
Fig-5
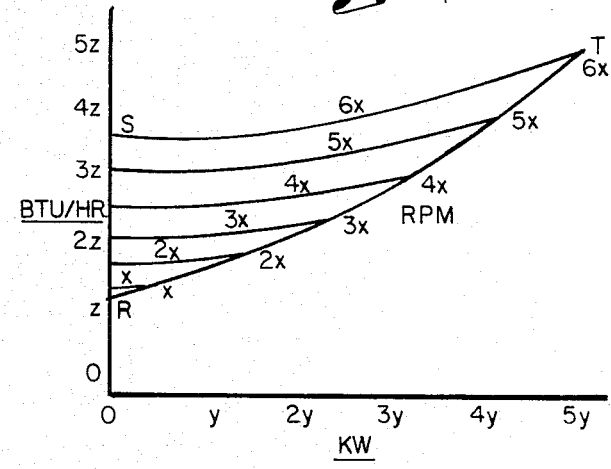
Fig-6
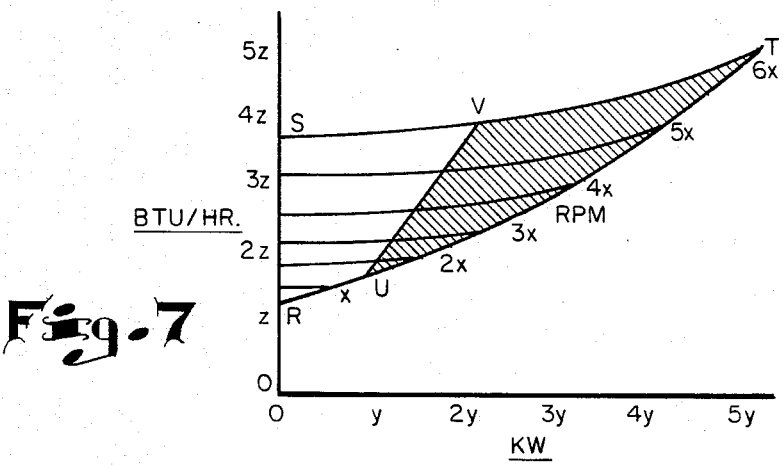
Fig-7

APPARATUS FOR GENERATING HEAT AND ELECTRICITY

BACKGROUND OF THE INVENTION

1. Field of the Invention

The present invention relates to devices and techniques for generating thermal (heat) energy and electrical energy and, more particularly, to devices and methods adapted to provide heat and electricity to buildings and the like in association with heat and electricity normally provided by public utilities. Specifically, the present invention relates to an improved cogeneration device for providing both thermal and electrical energy to a facility and the like and having substantially improved efficiencies and economics of operation as well as providing maximum electrical energy during times of utility power outages to the facility.

2. Description of the Prior Art

Devices designed to generate both heat and electricity are well known in the art. Some examples of such devices are disclosed in U.S. Pat. Nos. 1,552,661; 1,761,849; 2,051,240; and 4,164,660. In these particular patents, cogeneration units are disclosed having a central power plant that generally consists of an internal combustion engine powered by diesel or other types of fuel. Waste heat from the central power plant is utilized to heat water for thermal heating purposes, and the power output of the plant is designed to run a generator to generate electricity. U.S. Pat. No. 2,130,606 shows a similar type of system which is specifically adapted to heat or cool a residence while simultaneously producing electricity for the residence.

Thermal energy is derived from coolant fluid flowing through the central power unit and drawing heat therefrom as well as from the hot exhaust gases generated by the central power unit. U.S. Pat. Nos. 4,065,055 and 4,264,826 both disclose cogeneration systems which utilize engine exhaust gases for heating and cooling purposes. Finally, U.S. Pat. No. 2,637,305 discloses a similar type of cogeneration system whereby the coolant fluid is first passed through the engine to take up heat and is further heated by the hot exhaust gases from the engine in a heat exchange system. The heat retained by the coolant fluid is then utilized for heating purposes.

One aspect that is in common to all of the above identified prior art cogeneration systems is that the internal combustion engine or other unit utilized as a power source to run an electrical generator must be operated at a speed which provides a constant speed output. Thus, the constant-speed constraint of a conventional generator set requires that the power unit, i.e., generally an internal combustion engine, also be run at a constant speed. This is highly inefficient since the output of the engine is then limited to a fraction of its total capability, and the efficiency of the unit generally drops dramatically when the engine is operated at reduced load. Moreover, the inability to vary the engine's speed in response to varying thermal loads without changing the output frequency of the generator and thus the electrical output is a severe handicap in all the aforementioned prior art systems.

SUMMARY OF THE INVENTION

Accordingly, it is one object of the present invention to provide a device and method for generating both thermal and electrical energy.

It is another object of the present invention to provide a cogeneration device designed to supply both heat and electricity to a facility or the like in coordination with the heat and electricity supplied to the facility by public service sources.

It is a further object of the present invention to provide a device and method for generating both thermal and electrical energy for a facility which device and method are highly efficient and economical.

It is yet another object of the present invention to provide a device and method for generating thermal and electrical energy in response to thermal and electrical loads imposed thereon whereby the thermal energy output may be varied independently of the electrical energy output.

An additional object of the present invention is to provide a device and method for generating electricity and heat for a facility in conjunction with electricity and heat provided thereto by public service sources whereby the electrical output of the device is automatically brought to a maximum when the electrical input available from public service sources is substantially reduced due to a power shortage regardless of thermal load.

To achieve the foregoing and other objects and in accordance with the purpose of the present invention, an apparatus is provided for generating thermal and electrical energy outputs in response to thermal and electrical load requirements imposed thereon. The apparatus includes a variable speed power source and a mechanism for transferring thermal energy from the power source to a coolant fluid. A generator is also provided and is driven by the power source to produce electrical energy for the electrical load. The output frequency of the generator is independent of the speed of the power source. A mechanism is also provided for extracting the thermal energy from the coolant fluid and directing it to the thermal load. Finally, a device is provided for monitoring the loads and controlling the thermal and electrical outputs in response thereto by independently varying the speed of the power source and the output frequency of the generator to provide desired thermal and electrical energy outputs.

BRIEF DESCRIPTION OF THE DRAWINGS

The features of the present invention which are believed to be novel are set forth with particularity in the appended claims. The invention, together with further objects and advantages thereof, may best be understood by a reference to the following description taken in conjunction with the accompanying drawings in which:

FIG. 4 is a graph illustrating heat rejection of an internal combustion engine to its coolant and exhaust versus rotational speed;

FIG. 5 is a graph illustrating power output versus heat rejection of an internal combustion engine/generator cogeneration unit and is obtained by combining the plots illustrated in FIGS. 3 and 4;

FIG. 6 is a graph illustrating constant rotation speed of an internal combustion engine/generator cogeneration unit at varying power outputs versus heat rejection modes; and FIG. 7 is a graph substantially identical to that of FIG. 6 but illustrating an operating range of thermal and electrical power outputs of the present invention which are mechanically and economically feasible.

DETAILED DESCRIPTION OF THE PREFERRED EMBODIMENTS

Figure 1:
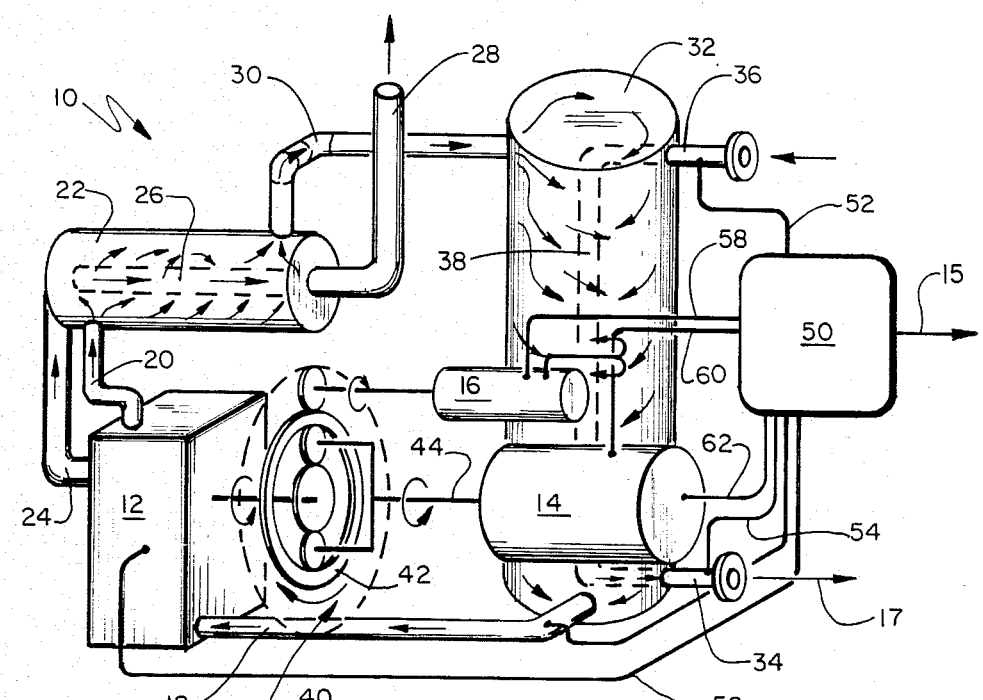
FIG. 1 is a schematic of an apparatus constructed in accordance with the present invention.

Referring now to the figures, and particularly to FIG. 1, a device 10 is disclosed for cogenerating both heat and electricity simultaneously. The device 10 includes a prime mover 12 which, in the preferred embodiment, is a variable speed internal combustion engine of conventional design. The prime mover may be powered by diesel, gasoline or any other conventional fuel source. An A.C. electrical generator 14 is also provided and is adapted to be driven by the engine 12. In preferred form, the generator 14 is a fixed speed generator adapted to maintain a maximum sixty cycle electric frequency. The generator 14 is arranged to provide the electrical energy output 15 of the device 10, and to this end any known type of generator 14 may be utilized therewith so long as it is adapted to conform with the remaining portions of the device 10 as explained in detail below. A frequency control motor 16 is also provided in conjunction with the generator 14 for adjusting the frequency output thereof as further described below.

The thermal output 17 of the device 10 is provided by the heat generated from the engine 12. To maximize the thermal output, heat from both the engine block as well as the exhaust gases is captured and then delivered to the thermal load served by the device 10. In the illustrated embodiment, a coolant fluid input line 18 is directed to the engine 12. As a coolant fluid passes through the engine 12, thermal energy is transferred thereto and is directed through the output line 20 to a preliminary heat exchanger 22. The exhaust gases of the engine 12 are captured and delivered through an exhaust outlet 24 to the heat exchanger 22. The exhaust gases pass through the heat exchanger 22, and more particularly through the exchange piping 26, and are then exhausted from the system through the outlet pipe 28. The coolant fluid passes into the exchanger 22 from the engine 12, flows around the pipe 26, and receives additional heat from the exhaust gases passing through the pipe 26. The fluid then passes out of the exchanger 22 through an exchanger outlet pipe 30 and is directed to a primary heat exchanger 32.

In the preferred embodiment, the thermal energy output 17 of the device 10 is delivered to a facility or the like through a hot water outlet 34. While water is used and referred to herein, it will be understood that any appropriate fluid may be used to deliver the thermal energy output 17. Once the facility has extracted or used the thermal energy delivered to it from the outlet 34, the cooled water is then returned to the primary heat exchanger 32 through an inlet 36. The cooled facility water (or secondary fluid) passes through the heat exchanger 32 by way of piping 38. Thus, thermal energy from the heated coolant fluid entering the heat exchanger 32 is transferred to the facility or secondary water within the piping 38 so as to provide hot water from the outlet 34. Once the coolant fluid has passed the entire length of the heat exchanger 32 and has delivered its thermal energy to the water contained within the piping 38, it is then redirected to the input line 18, thereby forming a closed loop system for the coolant fluid. The thermal energy delivered by the cogeneration device 10 to the thermal load takes advantage of all the thermal energy sources within the device 10. This means that thermal energy available from any gear boxes as well as engine oil is also captured by the coolant fluid within the engine container 12.

A unique feature of the present invention is the mechanism 40 utilized to interconnect the engine 12 with the generator 14 and which permits the speed of the engine 12 to be varied without varying the output of the generator 14. The mechanism 40, therefore, represents a variable speed input and a constant speed output device. This permits increased output availability and/or improved partial efficiency of the device 10. The mechanism 40 may be any one of several electrical and/or mechanical devices which provide a variable speed input and a constant frequency output. Examples of such potential mechanisms include gear trains with variable speed drives, D.C. motor generators with A.C. converters, and would rotor induction generators or so-called universal transformers. While the final selection concerning which of these specific arrangements is best suited for a particular application may be made following a comparative analysis of the first and life-cycle costs of each, one of the preferred mechanisms 40 which is illustrated in FIG. 1 is an epicyclic gear train 42.

With the gear train 42, the speed of the engine 12 may be varied thereby providing a variable speed input. However, the gear train 42 is adapted to provide a constant speed output along the shaft 44 so as to drive the generator 14 at a constant speed. Thus, as the engine speed 12 varies in accordance with thermal load requirements, the gear train 42 automatically adjusts the gearing so as to provide a constant speed output to the generator 14. This is due to the fact that the required rotational speed of the generator 14, typically, may be computed from the following equation (1):

$$\text{Speed} = (120 \times \text{frequency})/\text{Number of Generator Poles} \quad (1)$$

Thus, for a typical four pole generator, a consistent input speed of 1,800 RPM is required to maintain a constant 60 Hz output. Through the use of the epicyclic gear train 42, this may be maintained while simultaneously varying the speed of the engine 12. The gear train 42 is also coupled to the frequency control motor 16 so as to permit the frequency of the generator 14 to be adjusted in accordance with electrical loads imposed on the device 10 by the facility without affecting or requiring changes in the speed of the engine 12. Thus, when less than a maximum electrical load is required from the generator 14, electrical output of the generator 14 may be reduced in accordance with electrical load requirements independent of the thermal load of the facility. Likewise, as the thermal load requirements of the facility increase or decrease, the speed of the engine may be increased or decreased accordingly to produce more or less heat while maintaining whatever desired electrical output is needed up to the maximum of the generator 14.

A unit monitoring and control system 50 is provided for monitoring thermal and electrical loads being addressed by the device 10 as well as for controlling the thermal and electrical outputs of the device 10 in accordance with the load requirements being monitored. The control system 50 must monitor both loads and adjust the speed of the engine 12 to meet the electrical load while approximating as closely as possible the thermal load requirements. Simultaneously, the system must monitor the cost efficiency of this continued operation and determine when it is economically desirable to cease operation of the device 10 and import the required heat and electricity from other sources. For example, if the device 10 is utilized to provide heat and electricity for a building, the building also has heat and electrical power sources provided by the public utility service. The control system 50 must consider the economics involved and determine to what extent the heat and electrical loads of the building should be met by outside sources and/or by the device 10. Finally, the monitor system 50 continuously monitors the incoming voltage from the public utility and automatically starts up the device 10 to provide maximum electrical output regardless of the thermal load requirement of the building in the event of a utility power outage which substantially decreases or completely eliminates power input from the public utility source.

Electric demand is the parameter accorded top priority by the monitoring and control system 50. To avoid a complex system of load-shedding devices, the cogeneration device 10 is designed to be capable of meeting the maximum electric load of the facility in which it is installed or that portion of the facility's electric load which is to be provided by the cogeneration device 10. While the electric load of the facility in which the device 10 is installed may be monitored by any conventional means, the control system 50 preferably monitors the electric demand and load of the facility directly by means of a conventional transducer.

The control system 50 also monitors the thermal demand of the facility by monitoring the change of temperature of the facility's secondary water coolant from the point where it leaves the device 10 at outlet 34 to the point where the water returns to the device 10 at inlet 36. The greater the thermal demand of the facility, the greater the temperature difference between the water leaving the pipe 34 and returning at pipe 36. This thermal demand may be in the form of heating the building during winter months, for example, or cooling the building with a refrigeration unit during summer months. Control leads 52 and 54 are illustrated and used for monitoring the thermal load of the facility. The control system 50 likewise monitors fuel flow to the engine 12 by means of a gaseous or liquid flow meter (not illustrated), as applicable. The cost of electricity and heat from the outside public utility source as well as the fuel used by the engine 12 are fed into the memory of the control system 50. This may be done by any conventional means and preferably by standard microchip techniques. This information is used in calculations carried out by the control system 50 as described in greater detail below.

The control system 50 also includes leads 56 leading to the engine 12 to control the speed thereof, and leads 58, 60 and 62 leading to the frequency control motor 16 and the generator 14 in order to control the electrical output of the device 10.

During normal operation of the device 10, the control system 50 monitors electrical energy demand from a facility in which the device 10 is installed until a predetermined load is reached. The control system 50 then sends a signal to lock the frequency control motor 16, start the engine 12 and drive the engine 12 up to synchronous generator speed. The system then completes a warmup cycle. The control system 50 monitors the thermal load and varies the engine speed of the engine 12 while maintaining the electrical load requirements. The control system 50 selects the speed of the engine 12 which best matches the electrical load and the heat load. The frequency control motor 16 speeds up or slows down as required to maintain a 60 Hz output for the generator 14. The control system 50 also continuously monitors the incoming voltage from the outside public utilities source. If a voltage drop occurs thereby signaling a substantial decrease of electrical energy available from the public utilities service, such as in an energy blackout or brownout situation, the control system 50 automatically operates the device 10 at maximum electrical output while dumping heat into the atmosphere as required depending upon the thermal load of the facility. The key to this override scheme is that the thermal requirements of the facility are ignored along with preferred economic operational ranges in such emergency situations.

Figure 2:
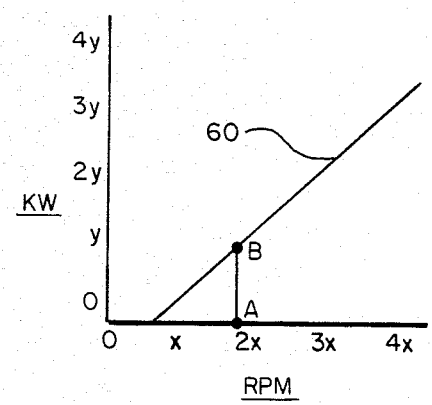
FIG. 2 is a graph displaying output versus rotational speed of a typical internal combustion engine/generator cogeneration unit.

Referring now to FIGS. 2-7, the plot 60 of FIG. 2 illustrates power output versus rotational speed of a typical internal combustion engine 12. If the engine 12 were directly connected to the generator 14 as in many prior art schemes, the engine 12 would be limited to a fixed speed necessary to operate the generator 14 at a constant speed. Thus, the output of the engine 12 would be limited to the maximum capacity of that engine 12 at the particular speed selected. The available power range at that speed is depicted, for example, in FIG. 2 by the line A-B. Under such circumstances, not only is the output limited to a fraction of the engine's capability, but the efficiency of the engine drops dramatically when the engine is operated at reduced load. Thus, the present invention's capability of varying the engine's speed without changing the output frequency of the generator 14 substantially increases the available output and/or improved partial load efficiency.

Figure 3:
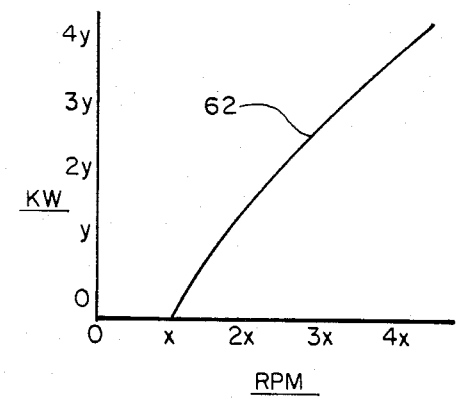
FIG. 3 is a graph illustrating continuous power rating versus rotational speed of an internal combustion engine/generator cogeneration unit.

As a result of the above, it is evident that it is always desirable to operate the engine 12 as nearly as possible to its continuous rating at a given speed in order to maximize the efficiency and minimize the operating costs of the engine 12. FIG. 3 illustrates a plot 62 showing the continuous power rating versus the rotational speed of the engine 12 coupled directly to a generator. As is illustrated, the power output drops to zero while the speed of the engine is still positive. This is due to the power required by the engine 12 to overcome its own internal friction losses. Similarly, in FIG. 4, a typical plot 64 of heat rejection by the engine 12 to both its coolant and exhaust versus the rotation speed of the engine 12 is illustrated. If FIGS. 3 and 4 are combined into a single plot, the result is the curve 65 depicted in FIG. 5 illustrating the relationship of power output versus heat rejection at various speeds of the engine 12 coupled to the generator 14.

In ideal situations, the thermal and electrical loads imposed on the device 10 would always plot along the continuous rating curve 65 of FIG. 5. However, in practice, this is not the case. For example, in the case of a winter night wherein the device 10 is providing heat and electricity to a building, the thermal load imposed by the building requirements would be at its peak, while the electric load would be extremely low. Under these conditions, the thermal and electric loads of the building would plot in FIG. 5 somewhere in the area depicted by way of example by point A. This point is clearly considerably off the continuous rating line 65. This would mean that the engine 12 would be required to operate at a higher speed but at reduced load. Plotting lines of constant speed at varying thermal and electric loads results in the graph illustrated by FIG. 6. This graph represents engine speed (lines X-6X) at any given electric and thermal load requirements while assuming, for the purposes of the graph illustrated in FIG. 6, that the maximum electric output capable of the generator 14 is represented by 5y. Utilizing a plot of the type illustrated in FIG. 6, it is possible to select the proper operating speed whenever the electric and thermal demand loads are known. Obviously, the electrical and thermal demands must fall within the capabilities of the engine 12 and the generator 14, and this is represented by the area enclosed by the lines R-S, S-T, and T-R. These three lines describe the thermal and electric capabilities of the engine 12 and the generator 14.

Although any point within the surface R-S-T-R defined above in FIG. 6 is potentially possible, many of the points thereon are not economical for the device 10 to meet. This is due to the fact that the cogeneration device 10 must take advantage of both the electric and thermal outputs in order to overcome the large scale economies enjoyed by the public utility providing electricity to the facility for thermal and electric loads therein. Points R and S, for example, are not desirable operating points for the device 10 since no electricity is produced, and it is highly inefficient to operate the engine 12 solely to recover heat therefrom to meet the thermal requirements of the facility. It is, therefore, necessary to apply an additional constraint to the control system 50 which reflects the economics of the application of the device 10. Such a constraint must include the demand for, and value of, electricity, heat and fuel as well as some factor to account for the capital, operation and maintenance costs of the device 10. A cost/benefit computation permits the control system 50 to determine whether or not continued operation of the device 10 is economically desirable. This computation takes the form of equation (2):

$$(kW \times CkW) + (BTU \times CBTU) > (F \times CF) \times K \quad (2)$$

In the above equation (2), kW is the electric demand imposed on the cogeneration device in kilowatts; CkW is the cost of electricity from the public utility source in dollars per kilowatt-hour; BTU is the thermal load imposed on the cogeneration unit 10 in British Thermal Units per hour; CBTU is the cost of heat for the facility from other sources such as electricity, oil or natural gas including the inefficiencies encountered in converting the fuel to useful heat energy in dollars per British Thermal Unit; F is the fuel flow to the engine 12 of the cogeneration device 10 measured in gallons per hour, cubic feet per hour or British Thermal Units per hour depending on the type of engine 12 and type of fuel involved; CF is the cost of the cogeneration device's fuel in dollars per gallon, cubic foot or British Thermal Unit; and K is a constant greater than 1.0 which takes into account the cost of money, wear and tear on the unit 10, maintenance and any other factor which should bear on the economics of operating the unit 10. Obviously, as K increases, so do the constraints imposed on operation of the cogeneration unit 10, thereby reducing the frequency and duration of use thereof.

Superimposing the economic constraint represented by equation (2) on FIG. 6 provides the graph illustrated in FIG. 7. The graph in FIG. 7 is virtually identical to that of FIG. 6 except for the presence of line U-V which represents the aforementioned economic constraint. The shaded area defined, then, by lines U-V, V-T, and T-U describes the operating range which is both mechanically and economically feasible for the device 10. Under normal operation of the device 10, when the control system 50 monitors the thermal and electric load requirements demanded from the device 10 and finds they are within the shaded area depicted in FIG. 7, the cogeneration unit 10 will be operated to meet those load requirements by varying the speed of the engine 12 and the electric output of the generator 14 independently. Likewise, should the control system 50 determine that the thermal and/or electrical load requirements fall outside the shaded area in FIG. 7, the cogeneration unit 10 will not be operated.

As previously mentioned, the control system 50 also monitors the electrical voltage of the power input from the public utility source to the facility wherein the device 10 is installed. In a situation where there is a blackout or brownout, the voltage from the public utility source will drop substantially or cease entirely. Under such circumstances, the control system 50 is adapted to sense this substantial drop in voltage, and to initiate the start sequence of the device 10. The cogeneration device 10 is then brought up to operating condition in order to meet the electric load of the facility or at least to produce maximum electric output available from the device 10. The economic and thermal constraints normally imposed on the operation of the device 10 are overridden and dismissed in this emergency mode of operation unless they are compatible with the electric demand. In other words, when a power outage occurs, the control system 50 ignores the normal thermal and economic constraints and operates at the engine speed which provides the electricity demanded at the cogeneration unit's continuous rating unless both the thermal and economic constraints plot within the shaded area depicted in FIG. 7. This implies that the cogeneration unit 10 will operate inefficiently and even dump heat to the atmosphere, if required, in order to provide electricity to the facility in such an emergency situation. Should the power outage occur while the cogeneration unit 10 is already in its normal operating mode, the control system 50 will monitor this and prevent the unit 10 from switching back to utility power regardless of the economic and thermal constraints. Depending on the constant speed input/constant frequency output device selected for use with the device 10, it may be necessary to fix the engine 12 at generator synchronous speed in order to maintain a constant frequency in the absence of the power source utility reference signal.

As can be seen from the above, the present invention provides an extremely economic and efficient system for generating both thermal and electric power to a facility in coordination and conjunction with power available from a public utility source. The invention also provides maximum electric power under emergency situations where there is a blackout or brownout from a public utility source. Moreover, due to the capability of varying engine speed independent of the output frequency of the generator of the unit, the cogeneration device of the instant invention can independently meet thermal and electrical load requirements of the facility unlike prior art designs. The control system associated with the present invention, however, will operate the system only under circumstances which provide maximum efficiency and economics of operation when considering the costs of power available from public utlities sources, unless the system is being operated in its emergency mode sequence.

It will be understood that the invention may be embodied in other specific forms without departing from the spirit or central characteristics thereof. The present examples and embodiments, therefore, are to be considered in all respects as illustrative and not restrictive, and the invention is not to be limited to the specific details given herein but may be modified within the scope of the appended claims.

I claim:

1. An apparatus for generating thermal and electrical energy outputs in response to thermal and electrical load requirements imposed thereon, said apparatus comprising:
   a variable speed power source;
   means for transferring thermal energy from said power source to a coolant fluid;
   a synchronous generator driven by said power source and adapted to produce an electrical energy output for said electrical load, the output frequency of said generator being independent of the speed of said power source;
   means for extracting thermal energy from said fluid and directing said thermal energy output to said thermal load;
   drive means for transferring the output of said power source to said generator and which permits the independently variable operation of said power source and said generator; and
   means for monitoring said loads and controlling said thermal and electrical outputs independently, in response to variations in thermal and electrical loads caused by economic and external thermal and electrical supply factors, by independently varying the speed of said power source and the output frequency of said generator to provide said thermal and electrical outputs.

2. The apparatus as claimed in claim 1, wherein said drive means has a variable speed input and constant speed output to permit generation of said generator output frequency independent of the speed of said power source.

3. The apparatus as claimed in claim 2 wherein said variable speed input and constant speed output means comprises a gear train having variable speed drives.

4. The apparatus as claimed in claim 3, wherein said gear train comprises an epicyclic gear train.

5. The apparatus as claimed in claim 4, wherein said epicyclic gear train is coupled with an A.C. frequency control means.

6. The apparatus as claimed in claim 2, wherein said variable speed input and constant speed output means comprises a D.C. motor generator with an A.C. converter.

7. The apparatus as claimed in claim 2, wherein said variable speed input and the constant speed output means comprises a wound rotor generator.

8. The apparatus as claimed in claim 1, wherein said thermal energy extraction means comprises a primary heat exchanger adapted to transfer thermal energy from said coolant fluid to a second fluid directed to said thermal load.

9. The apparatus as claimed in claim 1, wherein said power source comprises an internal combustion engine.

10. The apparatus as claimed in claim 1, wherein said monitoring and controlling means maintains the speed of said power source and the frequency output of said generator automatically within a mathematically predetermined range providing optimum performance and economics of operation for said apparatus during normal thermal and electrical load requirements.

11. The apparatus as claimed in claim 1, wherein said apparatus is adapted to augment additional thermal and elecrical energy inputs provided to said load from sources independent of said apparatus, and wherein said monitoring and controlling means further includes means to monitor the thermal and electrical energy inputs provided by said sources and to adjust the thermal and electrical outputs of said apparatus in relation to the energy inputs available from said sources to provide optimum performance and economics of operation during normal energy load requirements.

12. The apparatus as claimed in claim 11, wherein said monitoring means further includes means to override the normal operating parameters of said monitoring and controlling means to provide maximum electrical energy output by said apparatus when a substantial drop in electrical voltage energy input provided by said sources is sensed by said monitoring and controlling means.

13. The apparatus as claimed in claim 1, wherein said coolant fluid conduction means comprises means for transferring heat energy from said power source and all its associated component portions to said fluid.

14. The apparatus as claimed in claim 2 wherein said drive means comprises a belt linkage.

15. The apparatus as claimed in claim 2 wherein said drive means comprises a hydraulic assembly.

16. An apparatus as claimed in claim 1 whereby said monitoring and controlling means comprises a computer.

17. A device for cogenerating both heat and electricity in response to thermal and electrical loads imposed by a facility, in coordination with the electrical and thermal input from an external source, and in response to mathematically predetermined economic factors related to the operation of said device, said device comprising:
   a variable speed internal combustion engine;
   means for transferring thermal energy from said engine to a coolant fluid;
   means for directing engine exhaust gas away from said engine;
   a synchronous electrical generator driven by said engine to produce electricity for said electrical load, the output frequency of said generator being independent of the speed of said engine;
   means interconnecting said engine and said generator and having variable speed input and constant speed output;
   means for extracting heat from said fluid and exhaust gas and directing it to said thermal load;
   means for monitoring the thermal and electrical loads of said facility, the thermal and electrical energy inputs from said outside source available to said facility, and economic factors related to the operation of said device; and
   means for controlling the heat and electricity outputs in response to said loads, inputs, and factors by independently varying the speed of said engine and the output frequency of said generator to provide desired heat and electricity outputs.

18. The device as claimed in claim 17, wherein said variable speed input and constant speed output means comprises an epicyclic gear train.

19. The device as claimed in claim 18, wherein said epicyclic gear train is coupled with an A.C. frequency control mechanism.

20. The device as claimed in claim 17, wherein said heat extraction means comprises a primary heat exchanger adapted to transfer thermal energy from said coolant fluid and said exhaust gas to a second fluid directed to said thermal load.

21. The device as claimed in claim 20, wherein said heat extraction means further comprises a preliminary heat exchanger adapted to transfer thermal energy from said exhaust gas to said coolant fluid, and means to direct said coolant fluid from said preliminary heat exchanger to said primary exchanger to transfer said thermal energy to said second fluid.

22. The device as claimed in claim 17, wherein said monitoring and controlling means automatically maintains the speed of said engine and the frequency output of said generator within a mathematically predetermined range providing optimum performance and economics of operation, including shut-down of said device as needed, in response to said loads as well as the availability, efficiency and economy of the thermal and electrical energy available to said facility from said outside sources.

23. The device as claimed in claim 22, wherein said monitoring and controlling means further includes override means to provide maximum electrical output regardless of said economics of operation and optimum performance parameters when the electrical energy available to said facility from said outside source is substantially decreased.

24. The device as claimed in claim 17 wherein said interconnecting means comprises a belt assembly.

25. The device as claimed in claim 17 wherein said interconnecting means comprises a hydraulic assembly.

26. A device as claimed in claim 17 whereby said monitoring means and said controlling means comprises a computer.

27. The device claimed in claim 17 wherein said monitoring and controlling means includes override means to automatically operate said device at maximum electrical output in response to a substantial decrease in the electrical energy input available from said independent sources.

28. The device as claimed in claim 17, wherein said means for transferring thermal energy includes a heat exchanger for transferring said thermal energy to a second fluid adapted for travelling to and from said thermal load, and wherein said monitoring and controlling means comprises a computer to monitor said electric load and changes in temperature in said second fluid as it travels to and from said thermal load.

29. A method for generating both thermal and electrical energy outputs using an internal combustion engine and a synchronous electrical generator in response to thermal and electrical loads of a facility, to the electric power and thermal input from an external source, and to economic factors related to efficient application of said method, said method comprising:

interconnecting said generator with said engine to drive said generator so as to permit said generator to maintain an electrical output independent of the operation of said engine;

operating said engine;

transferring thermal energy from said engine to a coolant fluid;

extracting the thermal energy from said fluid and directing it to said thermal load;

generating an electrical output from said generator up to the maximum constant output of said generator;

monitoring the thermal and electrical loads of said facility and the electrical and thermal input from said external source, and calculating and incorporating economic facctors related to the efficient application of said method; and controlling the thermal and electrical energy outputs in response to said loads, said input, and said economic factors by independently varying the speed of said engine and the output frequency of said generator to provide desired thermal and electrical energy outputs.

30. The method as claimed in claim 29, wherein the thermal and electrical energy inputs provided from said external source are monitored, and wherein the normal facility load requirement parameters are automatically overridden to provide maximum electrical energy output by said generator when the independent electrical energy input from said external source has decreased substantially below the electrical energy requirement of said facility.

31. The method as claimed in claim 29, wherein normal electrical and thermal load requirements of said facility are automatically overridden to provide maximum electrical energy output by said generator when said electric power input from an external source has decreased substantially below the electrical energy requirement of said facility.

32. The device claimed in claim 17 whereby said monitoring and controlling means has the capability of reversing the electrical power flow back to said outside source.

33. The method as claimed in claim 29, wherein the speed of the engine and the frequency output of the generator are automatically maintained within a range which provides optimum performance and economics of operation in response to said loads, input, and factors during normal facility load requirements.

34. The apparatus as claimed in claim 2, wherein said synchronous generator and said drive means comprises a D.C. motor generator with an A.C. converter.

35. The apparatus as claimed in claim 2, wherein said synchronous generator and said drive means comprises a wound rotor generator.

* * * * *

UNITED STATES PATENT AND TRADEMARK OFFICE
CERTIFICATE OF CORRECTION

PATENT NO. : 4,686,378
DATED : August 11, 1987
INVENTOR(S) : Robert A. Sisk

It is certified that error appears in the above-identified patent and that said Letters Patent is hereby corrected as shown below:

Column 4, line 21, "would" should read -- wound --.

Signed and Sealed this

Twenty-second Day of December, 1987

Attest:

DONALD J. QUIGG

*Attesting Officer*    *Commissioner of Patents and Trademarks*